United States Patent
Cribbs

(10) Patent No.: US 8,463,085 B2
(45) Date of Patent: Jun. 11, 2013

(54) SYSTEMS AND METHODS FOR MONITORING A CONDITION OF A ROTOR BLADE FOR A WIND TURBINE

(75) Inventor: Timothy Botsford Cribbs, Roanoke, VA (US)

(73) Assignee: General Electric Company, Schenectady, NY (US)

( * ) Notice: Subject to any disclaimer, the term of this patent is extended or adjusted under 35 U.S.C. 154(b) by 118 days.

(21) Appl. No.: 12/972,221

(22) Filed: Dec. 17, 2010

(65) Prior Publication Data

US 2011/0211200 A1    Sep. 1, 2011

(51) Int. Cl.
| G02B 6/00 | (2006.01) |
| F03D 7/02 | (2006.01) |
| F03D 11/00 | (2006.01) |
| F03B 3/12 | (2006.01) |
| G01L 1/24 | (2006.01) |
| G01B 11/16 | (2006.01) |

(52) U.S. Cl.
USPC ............... 385/13; 73/800; 356/32; 356/35.5

(58) Field of Classification Search
None
See application file for complete search history.

(56) References Cited

U.S. PATENT DOCUMENTS

| 5,038,618 | A * | 8/1991 | Malvern ........................... 73/800 |
| 6,619,918 | B1 * | 9/2003 | Rebsdorf ........................... 416/1 |
| 7,059,822 | B2 | 6/2006 | LeMieux et al. |
| 7,086,834 | B2 | 8/2006 | LeMieux |
| 7,246,991 | B2 | 7/2007 | Bosche |
| 7,379,169 | B1 * | 5/2008 | Kraemer et al. ............. 356/73.1 |
| 2003/0127862 | A1 * | 7/2003 | Weitkamp ........................ 290/44 |
| 2004/0057828 | A1 * | 3/2004 | Bosche ............................. 416/1 |
| 2004/0108732 | A1 * | 6/2004 | Weitkamp ........................ 290/55 |
| 2005/0276696 | A1 * | 12/2005 | LeMieux ........................ 416/61 |
| 2008/0101930 | A1 * | 5/2008 | Bosche ........................... 416/31 |
| 2009/0246019 | A1 | 10/2009 | Volanthen et al. |
| 2010/0052320 | A1 | 3/2010 | Hoffmann |
| 2010/0209248 | A1 * | 8/2010 | Volanthen et al. ............. 416/61 |
| 2010/0232740 | A1 * | 9/2010 | Schilling et al. ................ 385/13 |
| 2010/0232961 | A1 * | 9/2010 | Volanthen et al. ............. 416/61 |
| 2011/0148112 | A1 * | 6/2011 | Ormel et al. .................... 290/44 |

FOREIGN PATENT DOCUMENTS

| DE | 102007058054 A1 * | 6/2009 |
| WO | 0202936 A1 | 1/2002 |

OTHER PUBLICATIONS

Machine Translation of the description of DE10 2007 058 154, Jun. 4, 2009.*
Machine Translation of the claims of DE 10 2007 058 054 A1, Jun. 4, 2009.*

* cited by examiner

Primary Examiner — Michelle R Connelly
(74) Attorney, Agent, or Firm — James McGinness, Esq.; Armstrong Teasdale LLP

(57) ABSTRACT

A rotor blade monitoring system for use with a wind turbine. The wind turbine includes at least one rotor blade. The rotor blade includes a sidewall that extends between a root portion and a tip portion. The rotor blade monitoring system includes a fiber optic strand that is coupled to the rotor blade sidewall. The fiber optic strand has a length that extends from the root portion towards the tip portion. A plurality of sensors are coupled to the fiber optic strand. Each sensor of the plurality of sensors is axially spaced along the fiber optic strand and is configured to transmit a signal indicative of a position of a respective portion of the rotor blade.

20 Claims, 6 Drawing Sheets

SYSTEMS AND METHODS FOR MONITORING A CONDITION OF A ROTOR BLADE FOR A WIND TURBINE

BACKGROUND OF THE INVENTION

The subject matter described herein relates generally to systems and methods for measuring a condition of a wind turbine, and more particularly, to a wind turbine that includes a rotor blade monitoring system configured to measure a condition of a rotor blade.

Because many known wind turbines provide electrical power to utility grids, at least some wind turbines have larger components (e.g., rotors in excess of thirty-meters in diameter) that facilitate supplying greater quantities of electrical power. However, the larger components are often subjected to increased loads (e.g., asymmetric loads) that result from wind shears, yaw misalignment, and/or turbulence, and the increased loads have been known to contribute to significant fatigue cycles on the rotor blades and/or other components of the wind turbine.

At least some known wind turbines include a nacelle fixed atop a tower. The nacelle includes a rotor assembly coupled to a generator through a shaft. In known rotor assemblies, a plurality of rotor blades extend from a rotor. The rotor blades are oriented such that wind passing over the rotor blades turns the rotor and rotates the shaft, thereby driving the generator to generate electricity. Known rotor blades are generally subjected to operational detriments from environmental elements, such as wind shear, extreme temperatures, icing, and general mechanical wear. Moreover, known rotor blades may be subjected to stresses that cause fatigue cracking and/or failure, which may eventually cause suboptimal performance of the wind turbine. At least some known monitoring systems include strain gauges that are coupled to a root portion of known rotor blades, and are configured to measure a strain at the root portion. Conventional methods for monitoring some known rotor blades include manual inspection, which may be infrequent, expensive, and/or time consuming and introduce undesirable delay and expense before the suboptimal performance can be addressed.

BRIEF DESCRIPTION OF THE INVENTION

In one aspect, a rotor blade monitoring system for use with a wind turbine is provided. The wind turbine includes at least one rotor blade. The rotor blade includes a sidewall that extends between a root portion and a tip portion. The rotor blade monitoring system includes a fiber optic strand that is coupled to the rotor blade sidewall. The fiber optic strand has a length that extends from the root portion towards the tip portion. A plurality of sensors are coupled to the fiber optic strand. Each sensor of the plurality of sensors is axially spaced along the fiber optic strand and is configured to transmit a signal indicative of a position of a respective portion of the rotor blade.

In another aspect, a wind turbine is provided. The wind turbine includes a tower, a nacelle that is coupled to the tower, a hub that is rotatably coupled to the nacelle, and at least one rotor blade that is coupled to the hub. The rotor blade includes at least one sidewall that defines a cavity that extends from a root portion towards a tip portion of the rotor blade. The blade sidewall extends between a leading edge and an axially-spaced trailing edge. A fiber optic strand is coupled to the blade sidewall. The fiber optic strand has a length that extends from the root portion towards the tip portion. A plurality of sensors are coupled to the fiber optic strand. Each sensor of the plurality of sensors is axially-spaced along the fiber optic strand and is configured to transmit a signal indicative of a position of a respective portion of the rotor blade.

In yet another aspect, a method for monitoring a rotor blade of a wind turbine is provided. The rotor blade includes a sidewall that extends between a leading edge and a trailing edge. The rotor blade extends between a root portion and a tip portion. The method includes operatively coupling a fiber optic strand to the rotor blade. The fiber optic strand extends from the root portion towards the tip portion of the rotor blade. The fiber optic strand has a length that extends along a centerline axis of the rotor blade. A plurality of sensors are coupled to the fiber optic strand. Each sensor of the plurality of sensors is spaced axially along the length of the fiber optic strand. Each sensor transmits at least one signal indicative of a position of a respective portion of the rotor blade to a measuring system. The measuring system calculates a deflection of the rotor blade based at least in part on the received signal.

DETAILED DESCRIPTION OF THE INVENTION

The embodiments described herein overcome disadvantages of known rotor blade monitoring systems by providing a system that facilitates measuring a condition of a rotor blade within a three-dimensional coordinate system. More specifically, the embodiments described herein include a rotor blade monitoring system that facilitates sensing a cross-sectional shape and/or deflection of a rotor blade and determines a condition of the rotor blade based on the sensed deflection. In addition, the condition measuring system described herein includes a fiber optic strand that includes a plurality of fiber Bragg gratings to enable the condition measuring system to calculate a deflection of the rotor blade within the three-dimensional coordinate system. By sensing a shape of the rotor blade in three-dimensions, the condition measuring system described herein more accurately calculates a deflection and a shape of the rotor blade than known monitoring systems.

Figure 1:
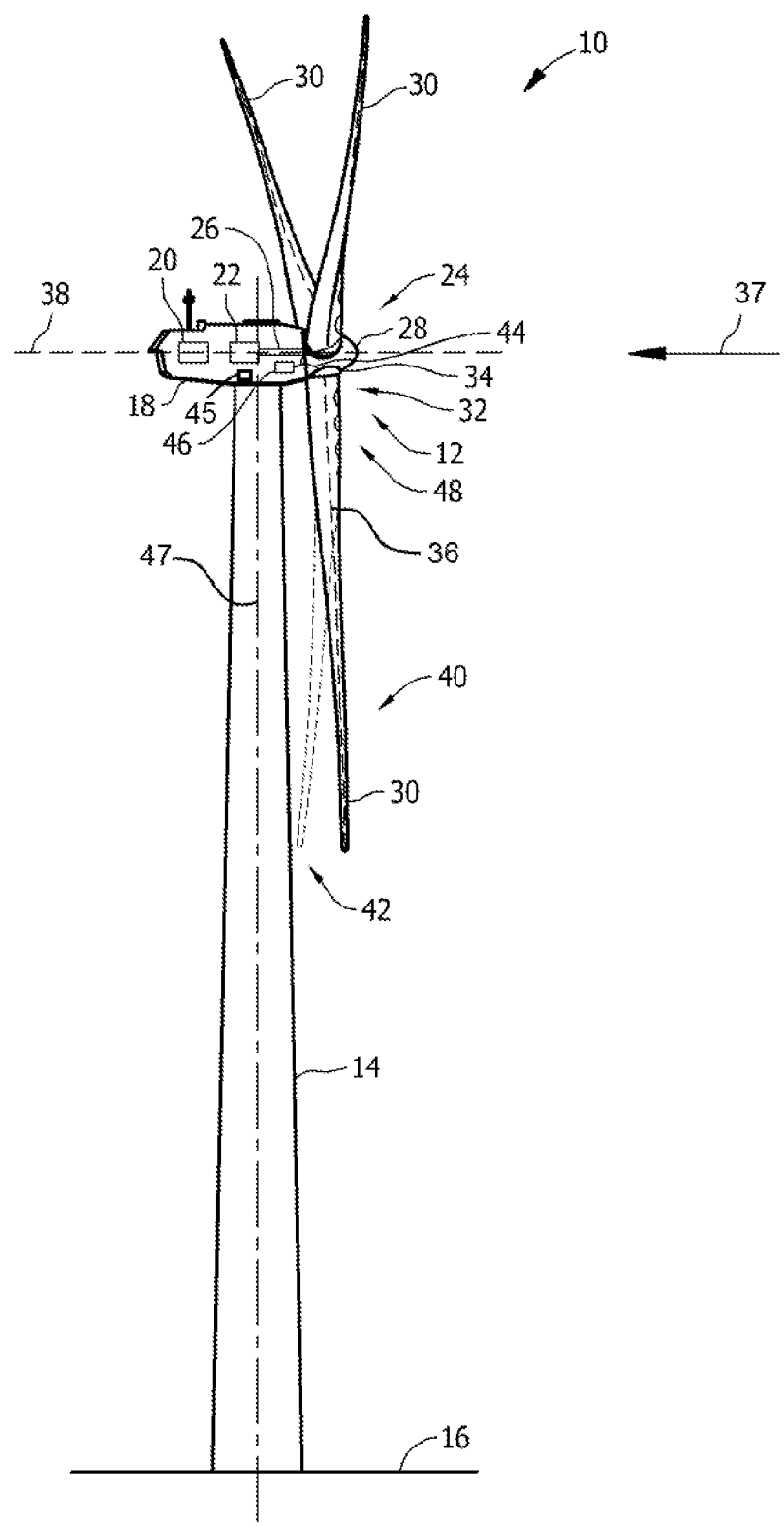
FIG. 1 is a perspective view of an exemplary wind turbine.

FIG. 1 is a perspective view of an exemplary wind turbine 10 that includes a rotor blade monitoring system 12. In the exemplary embodiment, wind turbine 10 is a horizontal-axis wind turbine. Alternatively, wind turbine 10 may be a vertical-axis wind turbine. In the exemplary embodiment, wind turbine 10 includes a tower 14 that extends from a support surface 16, a nacelle 18 that is mounted on tower 14, a generator 20 that is positioned within nacelle 18, a gearbox 22 that is coupled to generator 20, and a rotor 24 that is rotatably coupled to gearbox 22 with a rotor shaft 26. Rotor 24 includes a rotatable hub 28 and at least one rotor blade 30 coupled to and extending outwardly from hub 28. Alternatively, wind turbine 10 does not include gearbox 22, such that rotor 24 is coupled to generator 20 via rotor shaft 26.

In the exemplary embodiment, rotor 24 includes three rotor blades 30. In an alternative embodiment, rotor 24 includes more or less than three rotor blades 30. Rotor blades 30 are spaced about hub 28 to facilitate rotating rotor 24 to enable kinetic energy to be transferred from the wind into usable mechanical energy, and subsequently, electrical energy. Rotor blades 30 are mated to hub 28 by coupling a blade root portion 32 to hub 28 at a plurality of load transfer regions 34. Loads induced to rotor blades 30 are transferred to hub 28 via load transfer regions 34. In the exemplary embodiment, each rotor blade 30 defines a longitudinal spanwise axis 36 and has a length ranging from about 30 meters (m) (99 feet (ft)) to about 120 m (394 ft). Alternatively, rotor blades 30 may have any suitable length that enables wind turbine 10 to function as described herein. For example, other non-limiting examples of rotor blade lengths include 10 m or less, 20 m, 37 m, or a length that is greater than 120 m.

As wind strikes rotor blades 30 from a direction 37, rotor 24 is rotated about an axis of rotation 38. As rotor blades 30 are rotated and subjected to centrifugal forces, rotor blades 30 are also subjected to various forces and moments. As such, rotor blades 30 may oscillate, deflect and/or rotate from a neutral position, i.e. a non-deflected position 40, to a deflected position 42 (shown in phantom lines in FIG. 1). Moreover, a pitch angle or blade pitch of each rotor blade 30, i.e., an angle that determines a perspective of rotor blade 30 with respect to direction 37 of the wind, may be changed by a pitch adjustment system 44 to control the oscillation, load, and/or power generated by wind turbine 10 by adjusting an angular position of rotor blade 30 relative to wind vectors.

In the exemplary embodiment, wind turbine 10 includes a yaw system 45 that is coupled to nacelle 18 and to tower 14 to adjust a yaw of nacelle 18. As used herein, the term "yaw" refers to an orientation of nacelle 18 with respect to wind direction 37. In the exemplary embodiment, yaw system 45 is configured to selectively rotate nacelle 18 and rotor 24 with respect to tower 14 about a yaw axis 47 to control the perspective of rotor 24 with respect to wind direction 37. Rotor blade monitoring system 12 is coupled in operative communication to yaw system 45 to adjust a yaw of nacelle 18.

In the exemplary embodiment, rotor blade monitoring system 12 is coupled to one or more rotor blades 30 for monitoring rotor blade 30. More specifically, rotor blade monitoring system 12 is coupled to rotor blade 30 to enable measuring a shape and/or a position of rotor blade 30 with respect to spanwise axis 36. Rotor blade monitoring system 12 includes a measuring system 46 that is coupled in communication with a plurality of sensors 48. Each sensor 48 is coupled to rotor blade 30 to detect a position of at least a portion of rotor blade 30 at a defined location, and transmit signals indicative of the sensed position to measuring system 46. In the exemplary embodiment, measuring system 46 is positioned within nacelle 18. Alternatively, measuring system 46 may be a distributed system throughout wind turbine 10, on support surface 16, within a wind farm, and/or at a remote control center. In the exemplary embodiment, rotor blade monitoring system 12 is coupled in operative communication to pitch adjustment system 44 to control a pitch of rotor blades 30. In one embodiment, a pitch angle of each rotor blade 30 is controlled individually by a rotor blade monitoring system 12. Alternatively, the pitch angle for all rotor blades 30 may be controlled simultaneously by rotor blade monitoring system 12.

During operation of wind turbine 10, as wind strikes rotor blades 30 from a direction 37, an aerodynamic load is imparted on rotor blades 30 to cause rotation of rotor 24. Each rotor blade 30 is subjected to various environmental forces, i.e. wind loads and/or rotational loads that cause rotor blade 30 to oscillate and/or deflect from neutral position 40 to deflected position 42. When rotor blades 30 deflect and/or twist to deflected position 42, rotor blade 30 may be subjected to increased load stresses and/or fatigue cycles. Over time, the increased load stresses and/or fatigue cycles cause structural cracks and increased mechanical wear in rotor blade 30. Rotor blade monitoring system 12 is configured to monitor a shape and/or a position of rotor blade 30, and to monitor a deflection of rotor blade 30 from a predefined position. In addition, rotor blade monitoring system 12 is configured to notify an operator when rotor blade 30 deflects from a predefined position.

In one embodiment, rotor blade monitoring system 12 is configured to operate pitch adjustment system 44 to modulate a pitch angle of rotor blade 30 to facilitate reducing a deflection of rotor blade 30 such that rotor blade 30 operates within a predefined range of position values. Alternatively, rotor blade monitoring system 12 may operate pitch adjustment system 44 to change the pitch angle of rotor blade 30 such that rotor blade 30 is moved to a feathered position. In the feathered position, the perspective of rotor blade 30 relative to wind vectors provides a minimal surface area of rotor blade 30 to be oriented towards the wind vectors, which facilitates reducing a rotational speed of rotor 24 and/or facilitates a stall of rotor 24. In an alternative embodiment, rotor blade monitoring system 12 is configured to operate yaw system 45 to adjust a yaw of nacelle 18 to facilitate reducing a deflection of rotor blade 30 and/or adjust a vibration of rotor blade 30, rotor shaft 26, generator 20, and/or nacelle 18.

Figure 2:
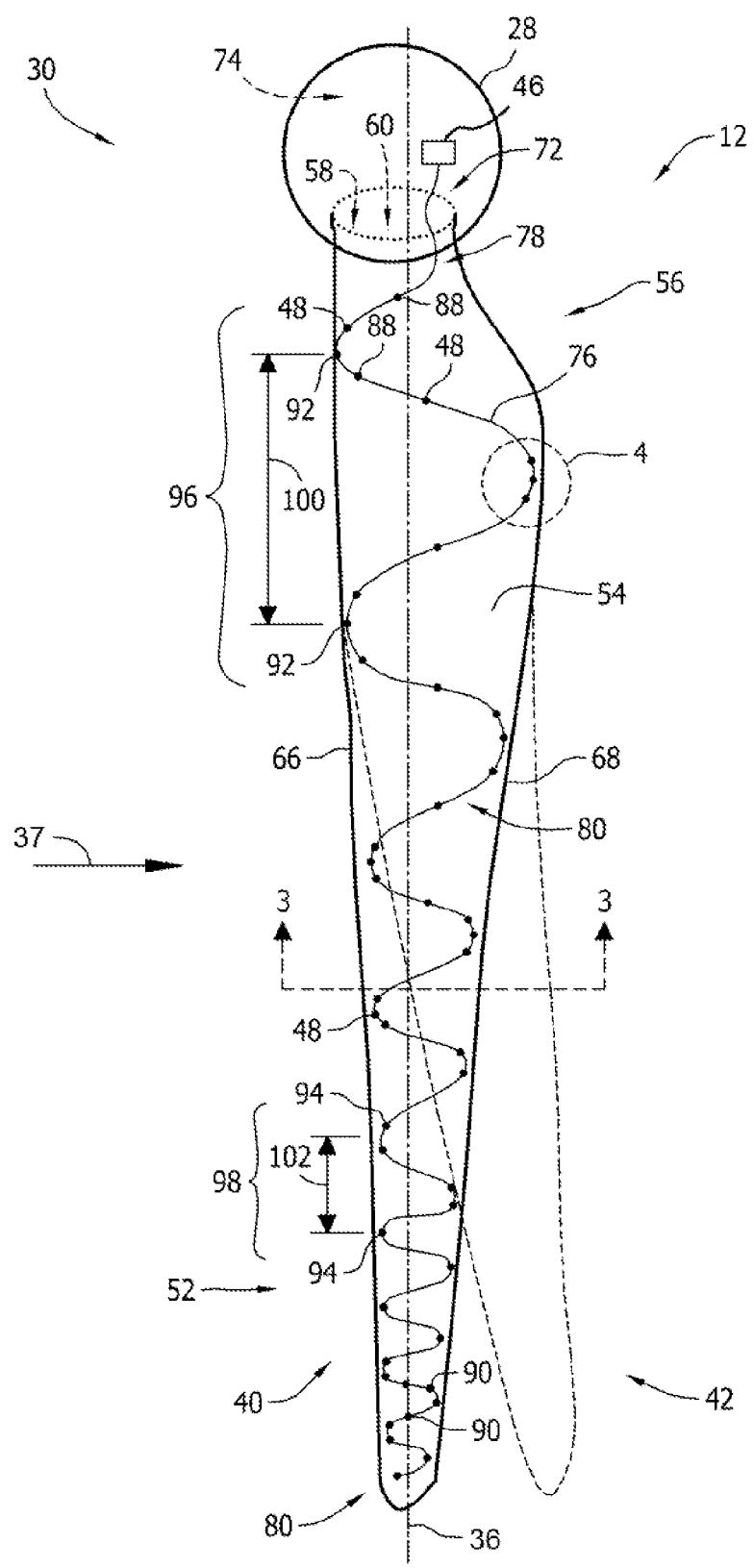
FIG. 2 is a perspective view of an exemplary rotor blade for use with the wind turbine shown in FIG. 1 that includes an exemplary rotor blade monitoring system.
Figure 3:
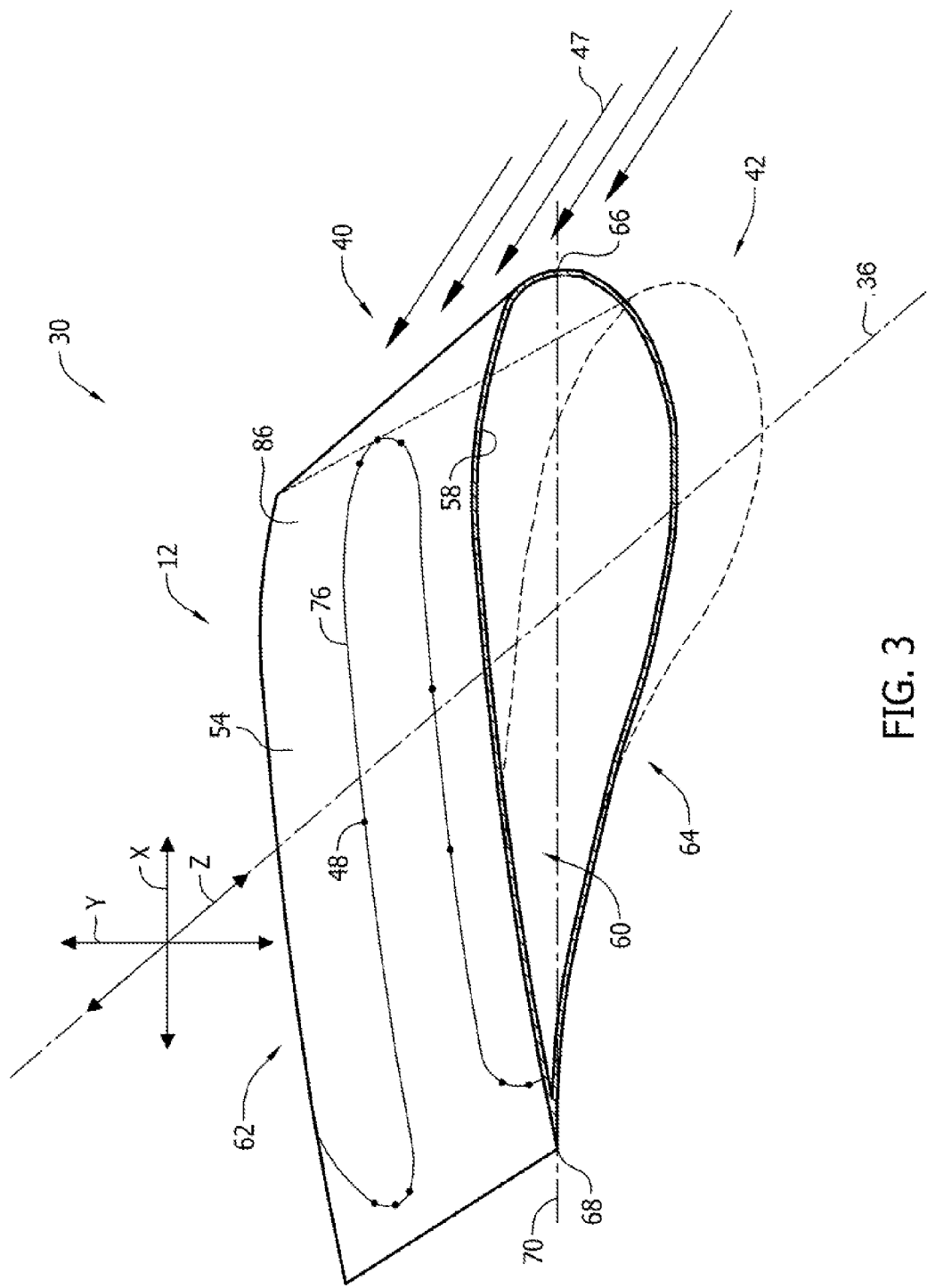
FIG. 3 is a cross-sectional view of the rotor blade shown in FIG. 2 along sectional line 3-3.
Figure 4:
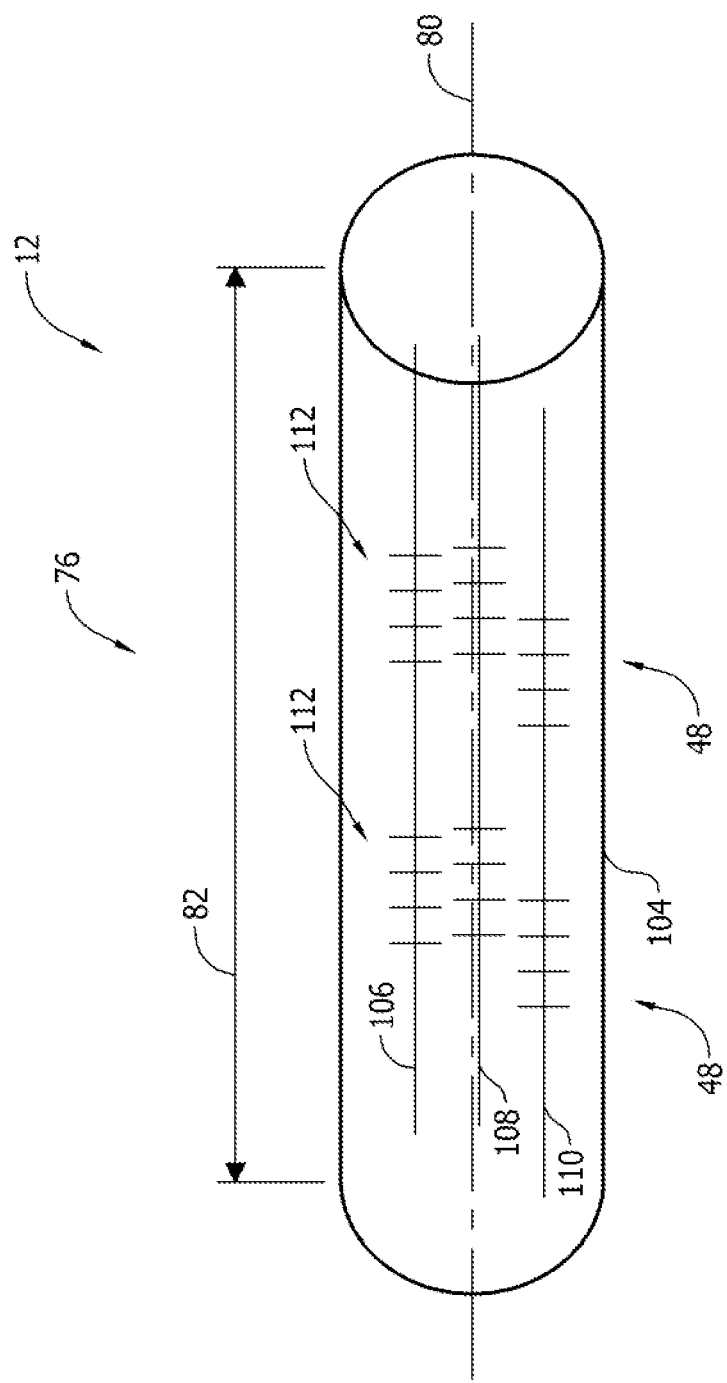
FIG. 4 is a sectional view of a portion of the rotor blade monitoring system shown in FIG. 2 taken along area 4-4.

FIG. 2 is a perspective view of an exemplary rotor blade 30 that is suitable for use with wind turbine 10. FIG. 3 is a cross-sectional view of rotor blade 30 along chordwise sectional line 3-3 in FIG. 2. FIG. 4 is a sectional view of a portion of rotor blade monitoring system 12 and taken along area 4 in FIG. 2. Identical components shown in FIG. 3 and FIG. 4 are labeled with the same reference numbers used in FIG. 2. In the exemplary embodiment, rotor blade 30 includes a first portion, i.e. a root portion 50, and a second portion, i.e. a tip portion 52, opposing root portion 50. Root portion 50 is configured to facilitate mounting rotor blade 30 to hub 28. Rotor blade 30 includes a blade sidewall 54 that extends between root portion 50 and tip portion 52 and along longitudinal spanwise axis 36. Blade sidewall 54 has an inner surface 58 that at least partially defines a blade cavity 60 that extends from root portion 50 towards tip portion 52.

In the exemplary embodiment, blade sidewall 54 includes a first blade section 62, such as a suction side blade section, and an opposing second blade section 64, such as a pressure side blade section. In this embodiment, first blade section 62 is coupled to second blade section 64 along a leading edge 66 and an axially-spaced trailing edge 68. Blade sidewall 54 extends between leading edge 66 and trailing edge 68 along a chordwise axis 70 that is defined between leading edge 66 and trailing edge 68. In the exemplary embodiment, first blade section 62 and second blade section 64 are coupled together to form an opening 72 at root portion 50. Hub 28 defines a hub cavity 74 and is coupled to rotor blade 30 such that opening 72 provides flow communication between hub cavity 74 and rotor blade cavity 60.

Referring to FIG. 3, in the exemplary embodiment, three perpendicular axis X, Y, and Z extend through rotor blade 30 to define a three-dimensional Cartesian coordinate system relative to rotor blade 30 such that the Z-axis is substantially coaxial with longitudinal spanwise axis 36, and such that the X-axis is substantially coaxial with chordwise axis 70. In the exemplary embodiment, sensors 48 are coupled to blade sidewall 54 for sensing a position of rotor blade 30 with respect to X-axis, Y-axis, and Z-axis, and for transmitting a signal indicative of the sensed position to measuring system 46. During operation, rotor blade 30 may move from neutral position 40 to one or more deflected positions 42 (shown in phantom lines in FIGS. 1-3). As shown in FIG. 2, during operation, as wind strikes rotor blades 30, rotor blade 30 may oscillate along Y-axis from neutral position 40 to deflected position 42. In addition, rotor blade 30 may also move to deflected position 42 along the X-axis (shown in phantom lines in FIG. 2). Moreover, as wind strikes rotor blades 30 from direction 37, rotor blade 30 may twist, such that a portion, i.e. tip portion 52, is rotated about the Z-axis to a deflected position 42 (shown in phantom lines in FIG. 3).

Referring again to FIG. 2, in the exemplary embodiment, rotor blade monitoring system 12 includes a fiber optic strand 76 that is coupled to each sensor 48. Fiber optic strand 76 extends between a first end 78 and a second end 80 and has a length 82 (shown in FIG. 4) that is defined along a centerline axis 84 that extends between first end 78 and second end 80. In the exemplary embodiment, each sensor 48 is defined within fiber optic strand 76 and is axially-spaced along fiber optic strand 76 and at least partially along length 82. In the exemplary embodiment, fiber optic strand 76 is coupled to inner surface 58 of rotor blade 30, and extends from root portion 50 towards tip portion 52. Alternatively, fiber optic strand 76 may be coupled to an outer surface 86 of rotor blade 30 and/or coupled between inner surface 58 and outer surface 86.

In the exemplary embodiment, one or more first sensors, i.e. root portion (RP) sensors 88, are positioned adjacent root portion 50 for sensing a position of root portion 50. One or more second sensors, i.e. tip portion (TP) sensors 90, are positioned adjacent tip portion 52 for sensing a position of tip portion 52. Fiber optic strand 76 is coupled between each RP sensor 88 and between each TP sensor 90 to enable rotor blade monitoring system 12 to determine a shape and/or deflection of rotor blade 30 along the X-axis and/or along the Y-axis. Rotor blade monitoring system 12 also includes one or more third sensors, i.e. leading edge (LE) sensors 92, that are positioned adjacent leading edge 66, and one or more fourth sensors, i.e. trailing edge (TE) sensors 94, that are positioned adjacent trailing edge 68. Fiber optic strand 76 is also coupled between each LE sensor 92 and between each TE sensor 94 to enable rotor blade monitoring system 12 to determine a shape and/or deflection of rotor blade 30 about the Z-axis. Alternatively, sensors 48 may be positioned at any suitable location across rotor blade 30 to enable rotor blade monitoring system 12 to function as described herein. In one embodiment, fiber optic strand 76 has a sinusoidal shape that extends from root portion 50 towards tip portion 52 and extends between leading edge 66 and trailing edge 68.

In one exemplary embodiment, rotor blade monitoring system 12 includes a first set 96 of sensors 48 that are positioned within root portion 50 and a second set 98 of sensors 48 that are positioned within tip portion 52. Adjacent sensors 48 of first set 96 are each spaced a first spanwise distance 100 along spanwise axis 36. Adjacent sensors 48 of second set 98 are spaced a second spanwise distance 102 that is less than first spanwise distance 100 such that rotor blade monitoring system 12 includes a greater density of sensors 48 within tip portion 52 than within root portion 50.

Referring to FIG. 4, in the exemplary embodiment, fiber optic strand 76 includes a multicore optical fiber 104 that includes three fiber cores 106, 108, and 110 to enable rotor blade monitoring system 12 to determine a shape and/or deflection of rotor blade 30 along the X-axis, the Y-axis, and the Z-axis. Alternatively, multicore optical fiber 104 may include any number of fiber cores to enable rotor blade monitoring system 12 to function as described herein. In the exemplary embodiment, each sensor 48 includes a fiber Bragg grating 112 that is disposed within each fiber core 106, 108, and 110. Each fiber Bragg grating 112 is configured to measure strain on the respective fiber cores 106, 108, and/or 110 as a position and/or orientation of multicore optical fiber 104 is changed. Each fiber Bragg grating 112 is configured to reflect a predetermined frequency band of light that is dependent upon the modulation period formed in a respective fiber core 106, 108, and/or 110.

In the exemplary embodiment, measuring system 46 includes a frequency domain reflectometer 114 (shown in FIG. 5) that is coupled in signal communication with multicore optical fiber 104 to receive signals that are transmitted from each fiber Bragg grating 112. Each fiber Bragg grating 112 is configured to transmit a signal indicative of an optical path length of fiber Bragg grating 112 to frequency domain reflectometer 114. Frequency domain reflectometer 114 is configured to calculate an optical path length between each fiber Bragg grating 112 and frequency domain reflectometer 114 along a respective fiber core 106, 108, and/or 110.

During operation, a movement of rotor blade 30 from neutral position 40 to deflected position 42 causes multicore optical fiber 104 and fiber Bragg gratings 112 to move with rotor blade 30. As multicore optical fiber 104 and fiber Bragg gratings 112 move, fiber Bragg gratings 112 stretch or compress causing the modulation period of fiber Bragg grating 112 to change, which in turn causes a shift in the frequency reflected by fiber Bragg grating 112. Frequency domain reflectometer 114 is configured to calculate the change in frequency, and to calculate the magnitude and direction of movement of each fiber Bragg grating 112 and of multicore optical fiber 104 based, at least in part, on the calculated change in frequency. Measuring system 46 is configured to calculate a position of each fiber Bragg grating 112 based, at least in part, on the calculated magnitude and direction of movement of each fiber Bragg grating 112. Measuring system 46 is also configured to calculate a shape and/or deflection of rotor blade 30 based, at least in part, on the calculated position of each fiber Bragg grating 112.

Figure 5:
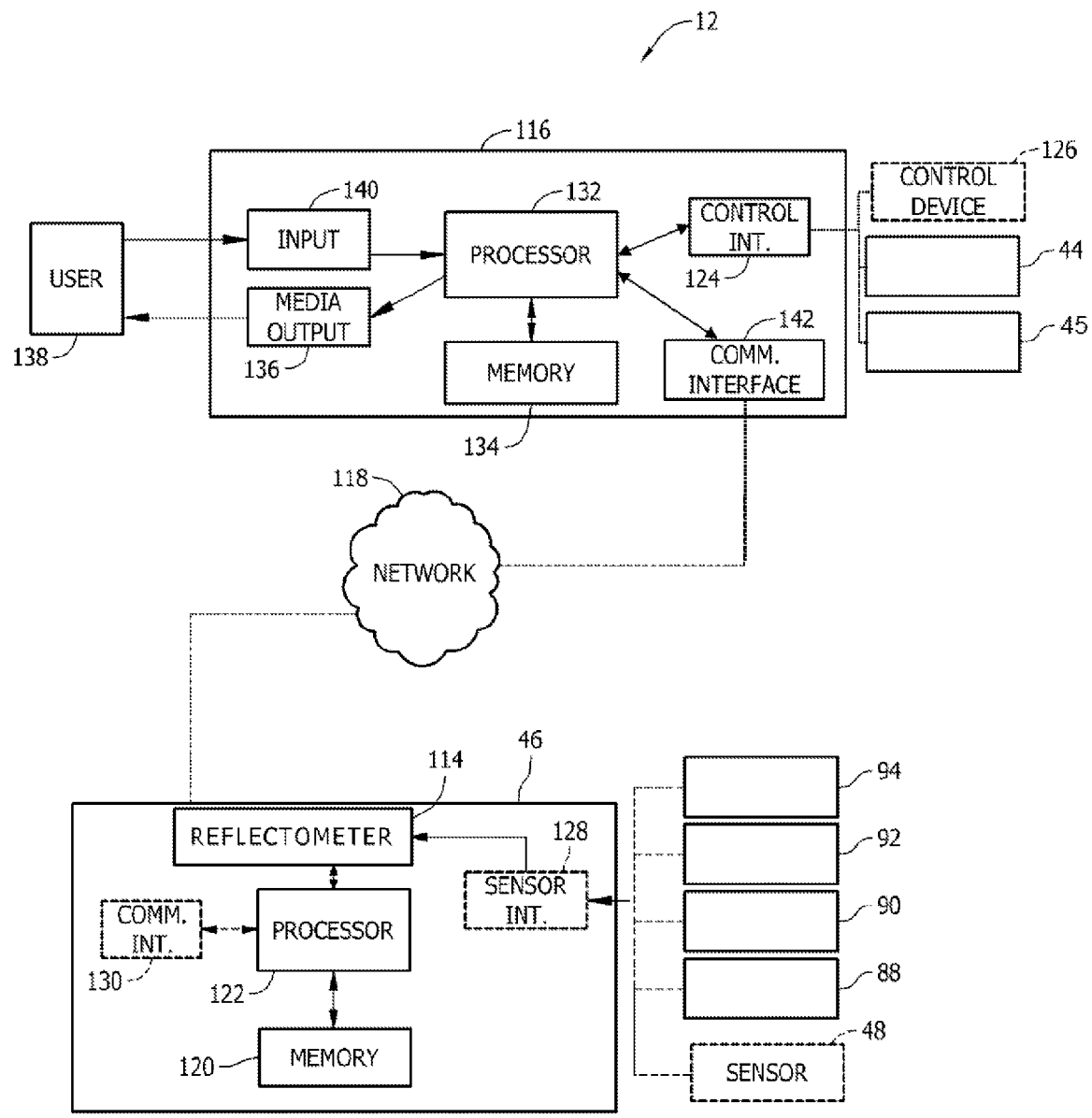
FIG. 5 is a block diagram illustrating the rotor blade monitoring system shown in FIG. 2.

FIG. 5 is a block diagram illustrating rotor blade monitoring system 12. In the exemplary embodiment, rotor blade monitoring system 12 includes a control system 116 that is coupled to measuring system 46 via network 118. For example, network 118 may include, without limitation, the Internet, a local area network (LAN), a wide area network (WAN), a wireless LAN (WLAN), a mesh network, and/or a virtual private network (VPN). Control system 116 and measuring system 46 communicate with each other and/or network 118 using a wired network connection (e.g., Ethernet or an optical fiber), a wireless communication means, such as radio frequency (RF), an Institute of Electrical and Electronics Engineers (IEEE) 802.11 standard (e.g., 802.11(g) or 802.11(n)), the Worldwide Interoperability for Microwave Access (WIMAX) standard, a cellular phone technology (e.g., the Global Standard for Mobile communication (GSM)), a satellite communication link, and/or any other suitable communication means. WIMAX is a registered trademark of WiMax Forum, of Beaverton, Oreg. IEEE is a registered trademark of Institute of Electrical and Electronics Engineers, Inc., of New York, N.Y.

In the exemplary embodiment, measuring system 46 is a real-time controller that includes any suitable processor-based or microprocessor-based system, such as a computer system, that includes microcontrollers, reduced instruction set circuits (RISC), application-specific integrated circuits (ASICs), logic circuits, and/or any other circuit or processor that is capable of executing the functions described herein. In one embodiment, measuring system 46 may be a microprocessor that includes read-only memory (ROM) and/or random access memory (RAM), such as, for example, a 32 bit microcomputer with 2 Mbit ROM and 64 Kbit RAM. As used herein, the term "real-time" refers to outcomes occurring at a substantially short period of time after a change in the inputs affect the outcome, with the time period being a design parameter that may be selected based on the importance of the outcome and/or the capability of the system processing the inputs to generate the outcome.

In the exemplary embodiment, measuring system 46 includes a memory area 120 configured to store executable instructions and/or one or more operating parameters representing and/or indicating an operating condition of rotor blade 30. Operating parameters may represent and/or indicate, without limitation, a position, a deflection, a rotational velocity, a wind speed, and/or a wind direction. In one embodiment, memory area 120 is configured to store a predefined range of position values that are received from control system 116. The predefined range of position values includes position values along rotor blade 30 that correspond to a location of each sensor 48 that is coupled to rotor blade 30. In the exemplary embodiment, measuring system 46 further includes a processor 122 that is coupled to memory area 120 and is programmed to calculate a condition of rotor blade 30 based at least in part on one or more operating parameters. For example, processor 122 may be programmed to calculate a condition of rotor blade 30 based on the predefined range of position values. In one embodiment, processor 122 may include a processing unit, such as, without limitation, an integrated circuit (IC), an application specific integrated circuit (ASIC), a microcomputer, a programmable logic controller (PLC), and/or any other programmable circuit. Alternatively, processor 122 may include multiple processing units (e.g., in a multi-core configuration).

In the exemplary embodiment, processor 122 is coupled to frequency domain reflectometer 114 for receiving signals indicative of a position of each sensor 48. Processor 122 is programmed to compare a sensed position received from frequency domain reflectometer 114 to a predefined range of position values. Processor 122 is further programmed to determine that a condition of rotor blade 30 is below the predefined rotor blade condition if the sensed position is not within the predefined range of position values.

In the exemplary embodiment, measuring system 46 includes a sensor interface 128 that is coupled to at least one sensor 48 such as, for example, one or more of RP sensor 88, TP sensor 90, LE sensor 92, and TE sensor 94, for receiving signals from sensor 48. Each sensor 48 generates and transmits a signal corresponding to a sensed position of rotor blade 30. Moreover, each sensor 48 may transmit a signal continuously, periodically, or only once, for example, though other signal timings are also contemplated. Furthermore, each sensor 48 may transmit a signal either in an analog form or in a digital form. In one embodiment, sensor interface 128 includes an analog-to-digital converter that converts an analog voltage signal generated by sensor 48 to a multi-bit digital signal usable by measuring system 46.

In some embodiments, measuring system 46 includes a communication interface 130. Communication interface 130 is configured to be coupled in communication with one or more remote devices, such as control system 116. Communication interface 130 may be configured to transmit an operating parameter and/or a control parameter (e.g., a pitch angle value) to a remote device. For example, communication interface 130 may be configured to encode an operating parameter and/or a control parameter in a signal. In addition, or alternatively, communication interface 130 may be configured to receive the operating parameter and/or the control parameter from a remote device and control an operation of wind turbine 10 based at least in part on the received operating parameter and/or control parameter.

Various connections are available between control interface 124 and control device 126 and between sensor interface 128 and sensor 48. Such connections may include, without limitation, an electrical conductor, a low-level serial data connection, such as Recommended Standard (RS) 232 or RS-485, a high-level serial data connection, such as Universal Serial Bus (USB) or Institute of Electrical and Electronics Engineers (IEEE) 1394 (a/k/a FIREWIRE), a parallel data connection, such as IEEE 1284 or IEEE 488, a short-range wireless communication channel such as BLUETOOTH, and/or a private (e.g., inaccessible outside wind turbine 10) network connection, whether wired or wireless.

In the exemplary embodiment, control system 116 includes a processor 132 for executing instructions. In some embodiments, executable instructions are stored in a memory area 134. Processor 132 may include one or more processing units (e.g., in a multi-core configuration). Memory area 134 is any device allowing information, such as executable instructions and/or other data, to be stored and retrieved.

Control system 116 includes a control interface 124 that is configured to control an operation of wind turbine 10 based at least in part on a calculated condition of rotor blade 30. In some embodiments, control interface 124 is operatively coupled to one or more wind turbine control devices 126 for example, pitch adjustment system 44 and yaw system 45 (shown in FIG. 1).

In addition, control system 116 includes at least one media output component 136 for presenting information to a user 138. Media output component 136 is any component capable of conveying information to user 138. Media output component 136 may include, without limitation, a display device (e.g., a liquid crystal display (LCD), an organic light emitting diode (OLED) display, or an audio output device (e.g., a speaker or headphones). In the exemplary embodiment, measuring system 46 is configured to transmit signals that are indicative of a shape of rotor blade 30 to control system 116. Processor 132 is programmed to receive the signals from control system and to convert the received signals to a shape of rotor blade 30 that is displayed on media output component 136. Processor 132 may be programmed to display a shape of rotor blade 30 continuously or periodically, for example, though other display timings are also contemplated. Processor 132 is also programmed to display neutral position 40 of rotor blade 30 and sensed deflected position 42 simultaneously.

In some embodiments, control system 116 includes an input device 140 for receiving input from user 138. Input device 140 may include, for example, a keyboard, a pointing device, a mouse, a stylus, a touch sensitive panel (e.g., a touch pad or a touch screen), a gyroscope, an accelerometer, a position detector, and/or an audio input device. A single component, such as a touch screen, may function as both an output device of media output component 136 and input device 140. Control system 116 also includes a communication interface 142, which is configured to be communicatively coupled to network 118 and/or rotor blade monitoring system 12.

In the exemplary embodiment, sensors 48 are configured to sense a position of at least a portion of rotor blade 30 and to transmit a signal indicative of the sensed position to measuring system 46. Measuring system 46 is configured to calculate a shape and/or a deflection of rotor blade 30 based, at least in part, on the received signal. Measuring system 46 is further configured to transmit a notification signal to an operator upon determining that the condition of rotor blade 30 is different than a predefined rotor blade condition. Measuring system 46 is configured to determine that a condition of rotor blade 30 is less than a predefined rotor blade condition upon determining that the sensed position of rotor blade 30 is different than a predefined position of rotor blade 30.

In one embodiment, RP sensors 88 are configured to sense a position of root portion 50 and to transmit a signal indicative of the sensed position to measuring system 46. TP sensors 90 are configured to sense a position of tip portion 52 and to transmit a signal indicative of the sensed position to measuring system 46. Measuring system 46 is configured to calculate a displacement of tip portion 52 with respect to root portion 50 along the X-axis and along the Y-axis based, at least in part, on the received signals from RP sensor 88 and TP sensor 90.

In another alternative embodiment, LE sensors 92 are configured to sense a shape of leading edge 66 with respect to spanwise axis 36 and to transmit a signal indicative of the sensed shape to measuring system 46. TE sensors 94 are configured to sense a shape of trailing edge 68 with respect to spanwise axis 36 and to transmit a signal indicative of the sensed shape to measuring system 46. Measuring system 46 is configured to calculate a displacement of leading edge 66 with respect to trailing edge 68 along the X-axis. In addition, measuring system 46 is configured to calculate a shape and/or a displacement of rotor blade 30 along the X-axis and along the Y-axis based, at least in part, on the received signals from TE sensors 94 and LE sensors 92. Measuring system 46 is also configured to calculate a shape and/or a deflection of rotor blade 30 about the Z-axis.

During operation of wind turbine 10, measuring system 46 is configured to transmit a signal indicative of a sensed shape of rotor blade 30 to control system 116. Measuring system 46 may be configured to transmit the sensed shape continuously or periodically to control system 116. Control system 116 is configured to display the sensed shape of rotor blade 30 with media output component 136 upon receiving the signal from measuring system 46. In one embodiment, measuring system 46 is configured to transmit a notification signal to control system 116 upon determining that the condition of rotor blade 30 is less than the predefined rotor blade condition. Control system 116 is configured to display a notification to user 138 with media output component 136 upon receiving the notification signal from measuring system 46. In an alternative embodiment, control system 116 is configured to operate pitch adjustment system 44 to modulate a pitch angle of rotor blade 30 to adjust a deflection of rotor blade 30 upon determining that the condition of rotor blade 30 is less than the predefined rotor blade condition. In another alternative embodiment, control system 116 is configured to control yaw system 45 to adjust a yaw of nacelle 18 upon determining that the condition of rotor blade 30 is less than the predefined rotor blade condition to reduce a deflection of rotor blade 30 and/or to reduce a vibration of rotor blade 30, rotor shaft 26, generator 20, and/or nacelle 18.

In an alternative embodiment, rotor blade measurement system 12 may be a stand-alone system and used to facilitate a design and/or testing of rotor blade 30, such as, for example, during testing of a rotor blade in a wind tunnel. In such an embodiment, measurement system 46 may be coupled in operational communication with a user computer device that is configured to determine an aerodynamic response of a rotor blade being tested. In the exemplary embodiment, rotor blade measurement system 12 may be used with rotor blades having various shapes and/or configurations such as, for example, rotor blades that include winglets, sweptback spanwise profiles, and/or blades configured to twist to relieve aerodynamic loading.

Figure 6:
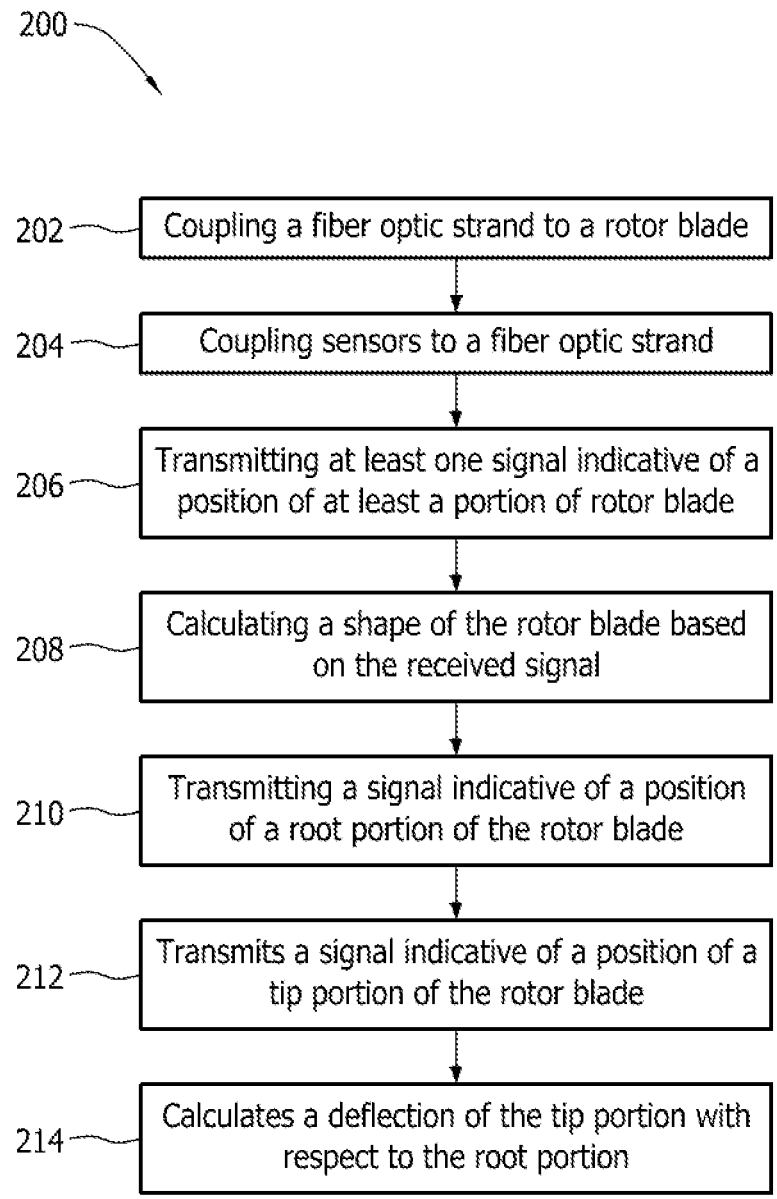
FIG. 6 is a flow chart illustrating an exemplary method for operating a rotor blade monitoring system for use with the wind turbine shown in FIG. 1.

FIG. 6 is a flow chart illustrating an exemplary method 200 of measuring a condition of rotor blade 30. In the exemplary embodiment, method 200 includes coupling 202 fiber optic strand 76 to rotor blade 30. Sensors 48 are coupled 204 to fiber optic strand 76 and are spaced axially along length 82 of fiber optic strand 76. Each sensor 48 transmits 206 at least one signal indicative of a position of at least a portion of rotor blade 30 to measuring system 46. Measuring system 46 calculates 208 a shape of rotor blade 30 based at least in part on the received signal.

In one embodiment, method 200 also includes transmitting 210, from RP sensor 88, a signal indicative of a position of root portion 50. TP sensor 90 transmits 212 a signal indicative of a position of tip portion 52. Measuring system 46 calculates 214 a deflection of tip portion 52 with respect to root portion 50 based, at least in part, on the received signals. Measuring system 46 transmits a signal indicative of a deflection of the rotor blade 30 to media output component 136. Media output component 136 displays a signal indicative of a deflection of the rotor blade 30. LE sensor 92 transmits a signal indicative of a position of leading edge 66. TE sensor 94 transmits a signal indicative of a position of trailing edge 68. Measuring system 46 calculates a displacement of leading edge 66 with respect to trailing edge 68 along chordwise axis 70.

An exemplary technical effect of the methods, system, and apparatus described herein includes at least one of: (a) transmitting, from a sensor to a control system, at least one signal indicative of a position of at least a portion of the rotor blade; (b) calculating, by the control system, a shape of the rotor blade based at least in part on the received signal; (c) calculating a deflection of the tip portion with respect to the root portion based at least in part on the received signal; and (d) displaying, on an output device, a signal indicative of a deflection of the rotor blade.

The above-described systems and methods facilitate measuring the condition of a rotor blade used with a wind turbine. More specifically, a rotor blade monitoring system facilitates sensing a shape and/or a deflection of a rotor blade and determining the condition of the rotor blade based on the sensed deflection. Further, the system described herein senses a deflection of the rotor blade within a three-dimensional coordinate system that enables the rotor blade monitoring system to more accurately calculate a deflection and shape over known monitoring systems. In addition, the system described herein operates the wind turbine to reduce a deflection of the rotor blade upon determining that the condition of the rotor blade is different than a predefined rotor blade condition. As such, the damage that can occur to a rotor blade and/or a wind turbine during operation is facilitated to be reduced or eliminated, thereby extending the operational life of a wind turbine.

Exemplary embodiments of systems and methods for measuring a condition of a rotor blade used with a wind turbine are described above in detail. The systems and methods are not limited to the specific embodiments described herein, but rather, components of the systems and/or steps of the methods may be utilized independently and separately from other components and/or steps described herein. For example, the methods may also be used in combination with turbine monitoring systems, and are not limited to practice with only the wind turbine systems as described herein. Rather, the exemplary embodiment can be implemented and utilized in connection with many other turbine monitoring applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A rotor blade monitoring system for use with a wind turbine, the wind turbine including at least one rotor blade, the rotor blade including a sidewall extending between a root portion and a tip portion, said rotor blade monitoring system comprising:
    a fiber optic strand coupled to the rotor blade sidewall, the fiber optic strand having a length extending from the root portion towards the tip portion; and,
    a plurality of sensors coupled to said fiber optic strand, said plurality of sensors comprising:
    a first set of sensors coupled to the root portion wherein adjacent sensors of said first set of sensors are spaced a first spanwise distance between the root portion and the tip portion; and,
    a second set of sensors coupled to the tip portion wherein adjacent sensors of said second set of sensors are spaced a second spanwise distance between the root portion and the tip portion, said second spanwise distance is different than said first spanwise distance, each sensor of said plurality of sensors axially spaced along said fiber optic strand and configured to transmit a signal indicative of a position of a respective portion of the rotor blade.

2. A rotor blade monitoring system in accordance with claim 1, further comprising a measuring system communicatively coupled to each sensor for receiving the signal from each said sensor, said measuring system configured to calculate a deflection of the rotor blade based on the received signal.

3. A rotor blade monitoring system in accordance with claim 2, further comprising a control system operatively coupled to a pitch adjustment system, said control system configured to adjust a pitch of the rotor blade based at least in part on the calculated deflection.

4. A rotor blade monitoring system in accordance with claim 1, wherein said fiber optic strand comprises a multicore optical fiber.

5. A rotor blade monitoring system in accordance with claim 1, wherein each sensor comprises fiber Bragg gratings for transmitting a signal indicative of an optical path length of said sensor.

6. A rotor blade monitoring system in accordance with claim 1, further comprising a first sensor positioned adjacent the root portion and a second sensor position adjacent the tip portion.

7. A rotor blade monitoring system in accordance with claim 6, wherein said measuring system is configured to calculate a displacement of the tip portion with respect to the root portion along a spanwise axis of the rotor blade.

8. A rotor blade monitoring system in accordance with claim 7, wherein said fiber optic strand extends from a leading edge to a trailing edge of the rotor blade, said rotor blade monitoring system further comprises a third sensor positioned adjacent the leading edge and a fourth sensor positioned adjacent the trailing edge.

9. A rotor blade monitoring system in accordance with claim 8, wherein said measuring system is configured to calculate a displacement of the leading edge with respect to the trailing edge along a chordwise axis of the rotor blade.

10. A wind turbine, comprising:
    a tower;
    a nacelle coupled to said tower;
    a hub rotatably coupled to said nacelle;
    at least one rotor blade coupled to said hub, said rotor blade comprising at least one sidewall defining a cavity extending from a root portion towards a tip portion of said rotor blade, said blade sidewall extending between a leading edge and an axially-spaced trailing edge;
    a fiber optic strand coupled to said blade sidewall, said fiber optic strand having a length extending from said root portion towards said tip portion; and,
    a plurality of sensors coupled to said fiber optic strand, said plurality of sensors comprising:
    a first set of sensors coupled to the root portion wherein adjacent sensors of said first set of sensors are spaced a first spanwise distance between the root portion and the tip portion; and,
    a second set of sensors coupled to the tip portion wherein adjacent sensors of said second set of sensors are spaced a second spanwise distance between the root portion and the tip portion, said second spanwise distance is different than said first spanwise distance, each sensor of said plurality of sensors axially-spaced along said fiber optic strand and configured to transmit a signal indicative of a position of a respective portion of said rotor blade.

11. A wind turbine in accordance with claim 10, further comprising a measuring system communicatively coupled to each sensor for receiving the signal from each said sensor, said measuring system configured to calculate a deflection of said rotor blade based on the received monitoring signal.

12. A wind turbine in accordance with claim 10, wherein said fiber optic strand comprises a multicore optical fiber.

13. A wind turbine in accordance with claim 10, wherein each sensor comprises fiber Bragg gratings for transmitting a signal indicative of an optical path length of said sensor.

14. A wind turbine in accordance with claim 10, further comprising a first sensor positioned adjacent the root portion and a second sensor position adjacent the tip portion, said measuring system is configured to calculate a displacement of the tip portion with respect to the root portion.

15. A wind turbine in accordance with claim 14, wherein said fiber optic strand extends from the leading edge to the trailing edge, said wind turbine further comprising a third sensor positioned adjacent the leading edge and a fourth sensor positioned adjacent the trailing edge, wherein said measuring system is configured to calculate a displacement of the leading edge with respect to the trailing edge along a chordwise axis of said rotor blade.

16. A method for monitoring a rotor blade of a wind turbine, the rotor blade including a sidewall extending between a leading edge and a trailing edge, the rotor blade extending between a root portion and a tip portion, said method comprising:
   operatively coupling a fiber optic strand to the rotor blade, the fiber optic strand extending from the root portion towards the tip portion of the rotor blade, the fiber optic strand having a length extending along a centerline axis of the rotor blade;
   coupling a plurality of sensors to the fiber optic strand, said plurality of sensors comprising:
      a first set of sensors coupled to the root portion wherein adjacent sensors of said first set of sensors are spaced a first spanwise distance between the root portion and the tip portion; and,
      a second set of sensors coupled to the tip portion wherein adjacent sensors of said second set of sensors are spaced a second spanwise distance between the root portion and the tip portion, said second spanwise distance is different than said first spanwise distance, each sensor of the plurality of sensors spaced axially along the length of the fiber optic strand;
   transmitting from each sensor to a measuring system, at least one signal indicative of a position of a respective portion of the rotor blade; and
   calculating, by the measuring system, a deflection of the rotor blade based at least in part on the received signal.

17. A method in accordance with claim 16, further comprising:
   positioning a first sensor adjacent the root portion for transmitting a signal indicative of a position of the root portion;
   positioning a second sensor adjacent the tip portion for transmitting a signal indicative of a position of the tip portion with respect to the root portion;
   calculating, by the measuring system, a deflection of the tip portion with respect to the root portion based at least in part on the received signal; and,
   displaying, on an output device, a signal indicative of the deflection of the rotor blade.

18. A method in accordance with claim 17, further comprising
   providing said fiber optic strand including a multicore optical fiber.

19. A method in accordance with claim 18, further comprising coupling a plurality of fiber Bragg grating sensors to the multicore optical fiber, each fiber Bragg grating sensor configured to transmit a signal indicative of an optical path length of the fiber Bragg grating sensor.

20. A method in accordance with claim 19, further comprising:
   positioning a third sensor adjacent the leading edge of the rotor blade for transmitting a signal indicative of a position of the leading edge;
   positioning a fourth sensor adjacent the trailing edge for transmitting a signal indicative of a position of the trailing edge with respect to the leading edge; and,
   calculating a displacement of the leading edge with respect to the trailing edge along a chordwise axis of the rotor blade.

* * * * *